United States Patent

[11] 3,628,984

[72] Inventors: Toshikatsu Ishikawa; Haruo Teranishi, both of Tokyo, Japan
[21] Appl. No.: 805,653
[22] Filed: Mar. 10, 1969
[45] Patented: Dec. 21, 1971
[73] Assignee: Nippon Carbon Company, Limited Tokyo, Japan
[32] Priority: May 27, 1968
[33] Japan
[31] 43/35440 May 28, 1968, Japan 43/35666

[54] METHOD FOR THE MANUFACTURE OF HEAT-RESISTANT CARBONACEOUS PRODUCTS HAVING LOW PERMEABILITY
5 Claims, 1 Drawing Fig.
[52] U.S. Cl. .................................. 117/46 CC, 117/161 UE, 117/161 UZ, 23/209.2, 23/209.4, 264/29
[51] Int. Cl. .................................. B44d 1/46
[50] Field of Search .................................. 117/46 CB, 46 CC, 161 UE, 161 UZ; 23/209.1, 209.4, 209.2; 264/29

[56] References Cited
UNITED STATES PATENTS

| | | | |
|---|---|---|---|
| 2,837,412 | 6/1958 | Bennett | 23/209.1 |
| 2,962,386 | 11/1960 | Doll et al. | 117/46 CC |
| 3,167,477 | 1/1965 | Tully et al. | 117/46 CB |
| 2,972,552 | 2/1961 | Winter | 117/46 CC |

FOREIGN PATENTS

| | | | |
|---|---|---|---|
| 247,994 | 11/1903 | Australia | 117/46 |
| 660,107 | 3/1963 | Canada | 117/46 |

Primary Examiner—William D. Martin
Assistant Examiner—M. Sofocleous
Attorney—Wenderoth, Lind & Ponack ABSTRACT: Two catalytic additives are added to a mixed solution of acetone and furfural to produce a resinous solution for use in impregnating a carbonaceous product. A carbonaceous article is impregnated with the solution at a reduced pressure, and the article is immersed in a concentrated sulfuric acid bath. Then, it is withdrawn from the acid bath, rinsed, and dried. Finally, it is subjected to a heat treatment at elevated temperatures to carbonize or graphitize the carbon product impregnated with the resinous solution.

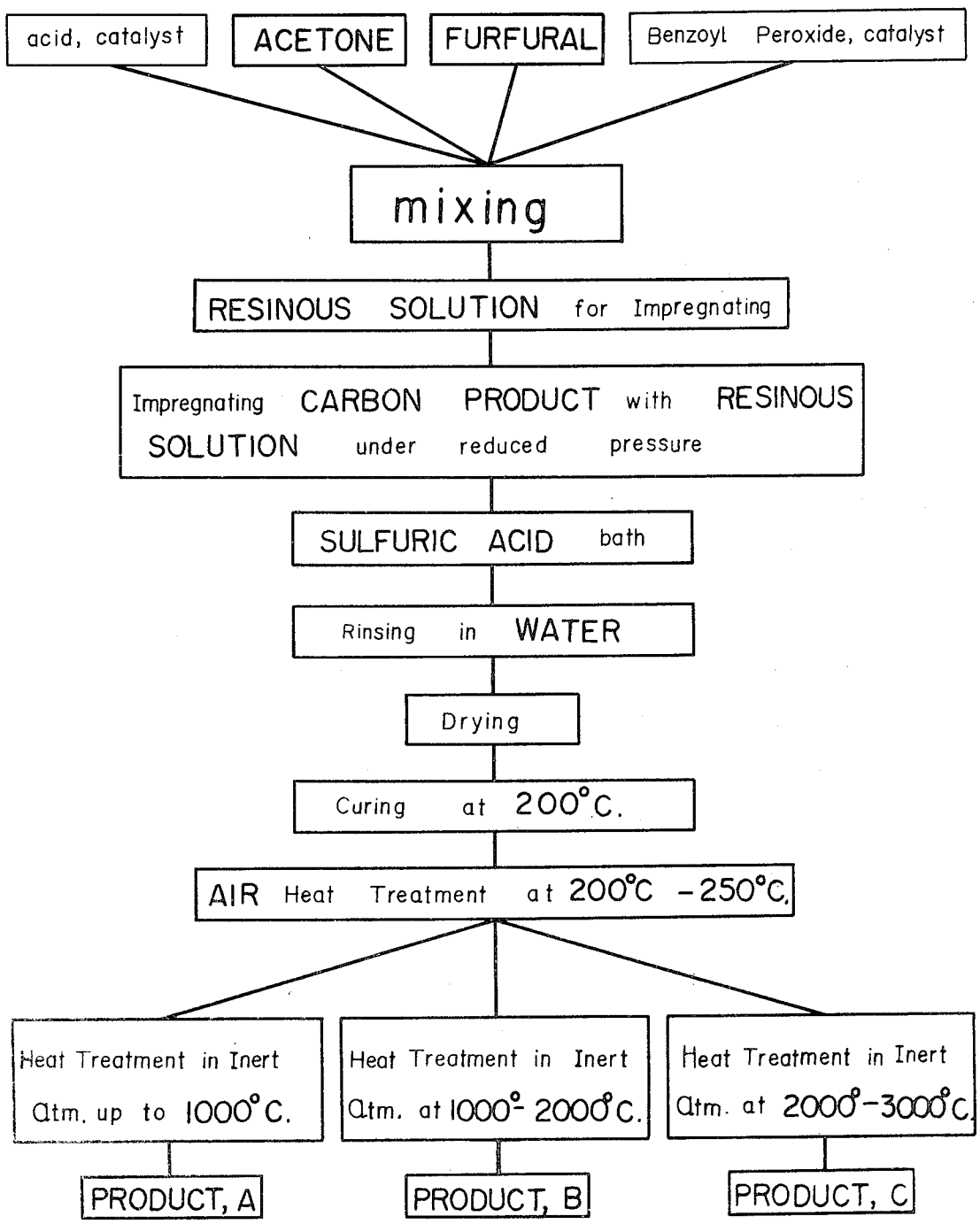

METHOD FOR THE MANUFACTURE OF HEAT-RESISTANT CARBONACEOUS PRODUCTS HAVING LOW PERMEABILITY

This invention relates to method for the manufacture of heat-resistant carbonaceous products having low permeability, and the carbonaceous products includes all forms and shapes thereof, such as, bars, rods, plates, blocks and crucibles, etc. In addition, this invention relates to a carbonaceous or graphitic crucible for aluminum vaporization which is resistant to attack by the high-temperature molten aluminum, and to a method for making the same.

In reference to the crystal structure of carbon, the above "carbonaceous" refers to the carbon still in the stage of an undeveloped crystalline structure resulting from a relatively low-temperature heat treatment at a temperature lower than 2,000° C. while "graphitic" to the carbon which has a lamellar crystalline structure of graphite by a relatively high-temperature heat treatment at a temperature in the range of 2,000° to 3,000° C. However, in the following description "carbonaceous" includes "graphitic," too.

A novel treatment of this invention can be applied to the conventional carbonaceous article of prior art:

1. A mixture of calcined cokes of different particles is molded with a binder, and then subjected to a carbonization or graphitization treatment.
2. A quantity of carbonaceous or graphitic fiber is molded under pressure with a binder, and then subjected to carbonization or graphitization, and
3. A quantity of high-molecular organic substance, such as, a high polymer, or bituminous material, such as, coal is molded with or without a binder, and subjected to carbonization or graphitization.

It has been found that a carbonaceous article having an apparent specific gravity of more than 1.50, porosity 25 percent, and gas permeability less than $10^{-2}$ cm.$^2$/sec. can be most advantageously subjected to the novel impervious treatment of this invention. In general, since the carbonaceous article contains about 20–30 percent by volume porous voids of the whole volume thereof due to the inherent cause of its manufacturing process, the porous voids should be filled in by some means so as to produce an impervious carbonaceous product, which is one of the most essential problems to be overcome in the carbon industry and many methods therefor have been proposed in the past.

In an industrial field wherein metal is vaporized in order to deposit thin film thereof on various substrates placed in a vacuum chamber, it is usual that a crucible or evaporator vessel containing the metal to be vaporized is made of carbon or graphite. As described above, the carbonaceous crucible is so porous that it has a very short operating life due to corrosion caused by molten metal at its vaporizing temperature. To prolong its operating life, such crucibles are usually coated on the actual evaporation surface with a chemically deposited impervious layer of such a carbide of titanium, zirconium, silicon or tungsten, or such an oxide of aluminum.

The use of the carbonaceous crucible for heating and melting aluminum, antimony, lead, bismuth, magnesium, copper, gold, silver and their alloys is well known. Of the metals described, aluminum tends to react at high temperature with a substance in contact therewith, and has a considerably low viscosity, for example, about 1.4 centipoise at the temperature of 800° C. Further, aluminum has about 1 centipoise or less almost equal to that of water at the temperature of 1,200° C. where aluminum vaporization for deposition takes place. Therefore, molten aluminum penetrates so deeply into voids of the carbonaceous crucible that it reacts with carbon at high temperature to form aluminum carbide. The formation of aluminum carbide results in weakening an area around it so quickly that it is attacked by molten aluminum to form another void. In this state, when the carbonaceous crucible is subjected to repetitive cycles of heating and cooling, it is attacked by molten aluminum again and again. Owing to the value of $2.38 \times 10^{-5}$ per centigrade of thermal expansion of aluminum, which is about 10 times as large as that of carbon, the crucible is finally destroyed.

In order to overcome the above disadvantage, there is proposed a method for preventing the formation of aluminum carbide within the carbonaceous article by increasing the apparent specific gravity of the carbon product more than 1.8 with a view to lessening the number of voids therein so as to obviate penetration of molten aluminum. To accomplish 1.8 or more of the specific gravity of the carbon article which has usually in the range of 1.45–1.65 thereof, there is a high-density method, one of the proposed ones, which comprises the steps of impregnating the carbon product with molten pitch, and heattreating it at a temperature of 1,000° C. or higher in a heat-treating furnace to convert the impregnated pitch into carbon. However, this high-density method requires several repeated cycles of the above step to develop a desired article for a prolonged period of time, so this is not an easy one. It is found that even the carbon crucible thus manufactured cannot be resistant to molten aluminum.

To make the carbon article to be impervious, there is also proposed a method wherein the article is impregnated with phenolic or furan resin to fill in the voids thereof. It is required, however, to impregnate with the above resin under a considerable pressure since it has such a high viscosity as, for example, about 200 centipoises. To lower the viscosity of the impregnating resin is considered, but in this case the resin tends to flow out of the voids of the article during a hardening treatment thereof, which may not be adapted for making the carbon to be impervious.

Based on the results of an experimental research conducted on various resins suitable for impregnation, we inventors have discovered an acetone-furfural resin to be an excellent impregnating composition for use in making the carbon product impervious or resistant to molten aluminum in view of its low viscosity.

As compared with the viscosity of the above impregnating resin, that of the acetone-furfural resin equals to about 0.4 centipoises. An exact composition of the acetone-furfural resin of this invention will be described hereinafter. In accordance with a preferred embodiment of the invention, the carbonaceous article including crucible is impregnated with the acetone-furfural resin of this invention under a reduced pressure to fill in the voids thereof, then the impregnated resin is hardened or cured in the presence of a hardening catalyst, and finally subjected to carbonization or graphitization at elevated temperatures. It has been found that Shore hardness of a carbonized or graphitized article thus manufactured is in the range of about 80 to 120 which is nearly twice as hard as the range of about 30 to 60 of the very common carbon product.

In reference to gas permeability, the carbon article of this invention has about $10^{-9}$ cm.$^2$/sec. on its carbonized layer of resin while the common carbon about $10^{-1}$–$10^{-2}$ cm.$^2$/second. Accordingly, it has been ascertained that the impervious carbon article made in accordance with the invention is impenetrable not only by the molten aluminum of low viscosity but also by gas, and further, aluminum carbide is hardly formed even though the molten aluminum is reactive.

Therefore, it is an essential object of this invention to provide a very effective impervious coating on a carbonaceous article including crucible in an easy and inexpensive manner.

It is another object of the invention to provide a method for the manufacture of an impervious coating on a heat-resistant carbonaceous product by impregnating it with a low-viscous resinous solution under atmospheric or reduced pressure at ambient temperature.

It is still another object of the invention to provide a most effective method for making a carbonaceous article to be impervious or resistant to the molten aluminum wherein the article is impregnated with a novel resinous solution having a better carbonization rate than that of the known resin together with a good gas permeability.

It is an additional object of the invention to provide a method for prolonging the operating life of a carbonaceous article including crucible wherein the deepest voids thereof have been filled in with a novel resinous solution which becomes hardened, carbonized and resistant to the molten aluminum at high temperature.

These and other objects and advantages of this invention will hereinafter appear in connection with the accompanying drawing in which:

The only FIGURE shows a flowsheet for carrying out a preferred embodiment of the invention.

A novel resinous solution in accordance with the preferred embodiment of the invention comprises 2–3 mols of acetone and 1–2 mols of furfural, with the addition of two catalysts, one being 0.1–5 percent by weight benzoyl peroxide, and the other 0.1–5 percent by weight an acid selected from the group consisting of hydrochloric acid, sulfuric acid and toluene-sulfonic acid. We have also discovered that another resinous solution of the same properties as the above can be obtained by adding a thermosetting resin soluble in the above solution, such as, furan or furfuryl alcohol, or mixing with a compound having two or more functional groups, such as, divinylbenzene or trivinylbenzene.

The invention will be described in connection with the accompanying flowsheet:

When a mixture of acetone and furfural is made, the viscosity thereof lowers if excess acetone is added. While this mixture containing excess acetone is effective for impregnating a carbon article, and advantageous in making a dense and hard structure on carbonization, it is found that the structure thereof shrinks so noticeably that cracks tend to occur thereon. On the other hand, however, the mixture containing excess furfural results in the formation of a good structure in which no crack occurs after carbonization, but a porous one with a low hardness.

It has been ascertained that a mixture of 2–3 mols acetone and 1–2 mols furfural provides a most excellent one. This liquid mixture is added with 0.1–5 percent by weight each of the two catalysts, respectively, one is a liquid acid selected from the group consisting of sulfuric acid, hydrochloric acid, and toluene-sulfonic acid, or a gaseous acidic substance selected from the group consisting of oxygen, ozone, and chlorine, and the other, 0.1–5 percent by weight benzoyl peroxide to provide an impregnating resinous solution. The gaseous catalyst is blown into the liquid mixture.

As described above, the thermosetting resin soluble in the above resinous solution, such as, furan or furfuryl alcohol, and the compound having two or more functional groups, such as, divinylbenzene or trivinylbenzene may be added or mixed to the resinous solution of this invention to provide the one of the same properties. Particularly, it has been found that a resinous solution consisting of acetone, furfural, and divinylbenzene has the viscosity of about 0.8 centipoises.

The resinous solution adapted for impregnation can be applied to the carbonaceous article by several known methods, such as, dipping, brushing, and spraying, etc. As this solution has an exceedingly low viscosity as described hereinbefore, an object to be applied, particularly, a porous carbon object, is preferably dipped in it under the conditions of room temperature and atmospheric or reduced pressure for a period of 0.5–1 hour. It is seen that light gases and air occluded within the porous article are removed therefrom under the reduced pressure. Therefore, the voids thus produced throughout the article tend to absorb the solution deeply into the niches thereof.

Subsequently, the carbon article thus impregnated with the solution for a period of 30 minutes to 1 hour is withdrawn from the bath, and plunged into a bath of sulfuric acid of 95 percent concentration for a period of 10 to 16 hours to completely cure or harden the resinous solution applied and penetrated into the carbon article. This immersion treatment by the sulfuric acid bath prevents oozing out of the solution from the pores of the article due to its low viscosity.

In the sulfuric acid bath, the concentrated sulfuric acid, such as, 95 percent, is preferred because it promotes a curing or hardening speed of the solution faster then a dilute one. Moreover, the concentrated sulfuric acid has so high a specific gravity that it applies some pressure on the surface of the impregnated carbon article to prevent exudation of the solution out of the pores thereof while accelerate curing or hardening it rapidly.

Then, the carbon article treated by the sulfuric acid bath is rinsed in water to remove excess sulfuric acid remaining on the surface thereof, then dried, heated at the temperature of 200° C. to cure and further, additionally heated at a temperature of 200°–250° C. to cure or harden the uncured resinous liquid. It is found that when the carbon article impregnated with the resinous solution and having the hardened surface thereof is subjected to a complete hardening treatment, several cycles of the known hardening treatment is no longer required, yet the resinous liquid can be considerably filled into the pores of the carbon article. Of the heat treatment of the carbon article at a temperature of 200°–250° C. described above, a most beneficial one lies in a heat treatment lies in the hot air heated to the temperature of 250° C.

By this heat treatment in the hot air, it is found that the carbon article becomes more resistant to gas permeability, and nearly all the hardened resinous composition filled in can be effectively carbonized when subjected a carbonization treatment. Hence, the addition of a single heat treatment in the hot air to the complete hardening treatment does beneficial effects in making the carbon article to be impervious to the attack of deleterious gases and other substances instead of subjecting to a plurality of hardening treatments.

Lastly, the carbon article thus impregnated and cured or hardened is subjected to the final carbonizing treatment in an inert atmosphere at high temperature for carbonizing and/or graphitizing the filled in and impregnated resinous substance. This carbonizing and/or graphitizing treatment is well known in the carbon industry. It is known that an object to be carbonized and/or graphitized is heattreated at a temperature of 1,000° to 3,000° C. in the inert atmosphere. In general, it is known that the heat treatment at a temperature up to 1,000° C. in an inert atmosphere is preferred to be effected for a period of 100–200 hours, at a temperature of 1,000°–2,000° C. for a period of at least 15 minutes, and at a temperature of 2,000°–3,000° C. for at least 15 minutes. The details of this heat treatment are omitted for brevity.

It is to be noted here that the resinous solution described hereinbefore subjected to a treatment of hardening and carbonizing at a temperature up to 1,000° C. turns out to be a so-called vitreous hard carbon which has about $10^{-9}$ cm.$^2$/sec. of gas permeability while a common carbonized product about $10^{-1}$ cm.$^2$ per second, showing the ratio of 100,000,000:1.

For reference, table 1 shows physical properties of two kinds of the resinous solution of this invention treated in the above-described process and heattreated at the temperature of 800° C.

Table 1

| | acetone furfural & two catalysts | acetone-furfural & 25% divinylbenzene & two catalysts |
|---|---|---|
| viscosity | 0.4 | 0.8 |
| carbonization yield | 50% | 48% |
| apparent specific gravity | 1.2 | 1.3 |
| Shore hardness | 110–120 | 120 |
| thermal expansion | $3-4\times10^{-6}$/° C. | $3-4\times10^{-6}$/° C. |
| gas permeability | $10^{-9}$ cm.$^2$/sec. | $10^{-9}$ cm.$^2$/sec. |

By the way, following comparative tests have been conducted on the effects and advantages of the impervious resinous coating composition of this invention. Resinous solutions of the following different composition have been prepared, and four graphite pipes are impregnated with them, and treated in accordance with the process of this invention, respectively, the results of which are shown in table 2.

1. The resinous solution consisting of 2 mols acetone and 1 mol furfural, added with two catalysts, sulfuric acid, and benzoyl peroxide.
2. A resinous solution consisting of 2 mols acetone and 1 mol furfural, with no addition of catalyst.
3. A solution of furfural with two catalysts, sulfuric acid, and benzoyl peroxide without acetone.
4. A solution of furfural only with no additive.

furic acid bath for a period of 10–16 hours to harden the surface layer of the resinous solution. Then, the pipe is water washed to remove excess sulfuric acid remaining on the pipe, dried, and heated at the temperature of 200° C. to harden the unhardened resinous solution completely.

It is shown that the graphite pipe thus treated has 11.5 percent of the filled-in percentage of resin, 1.74 of apparent specific gravity, and $1.2 \times 10^{-8}$ cm.$^2$/sec., which is resistant to the air pressure, 4 kg./cm.$^2$.

Subsequently, the graphite pipe having a completely hardened resin is heattreated at the temperature of 1,000° C. in a nitrogen atmosphere to carbonize the completely

TABLE 2

| Composition | Furfural: 1 mol, acetone: 2 mol, sul. acid: 0.5% ben. per.: 0.5% | Furfural: 1 mol, acetone: 2 mol, no addition of catalyst | Furfural only, sul. acid: 0.5%, ben. per.: 0.5% | Furfural only, no addition of catalyst |
|---|---|---|---|---|
| Apparent specific gravity of raw carbon product | 1.56 | 1.55 | | Destruction. |
| Gas permeability of raw C product | $^1 0.21 \times 10^{-1}$ | $^1 0.22 \times 10^{-1}$ | | |
| Apparent specific gravity of cured resin of 1st dip, 200° C. | 1.74 | (²) | | |
| Fill-in percent of resin | 11.5 | | | |
| Gas permeability | $^1 1.2 \times 10^{-8}$ | | | |
| App. specific gravity of 1st carb. 1,000° C. | 1.65 | | | |
| Fill-in percent of carbonized resin | 5.8 | | | |
| Gas permeability | $^1 3 \times 10^{-5}$ | | | |
| Apparent specific gravity of 2d carb. 1,000° C. | 1.68 | | 1.67 | |
| Fill-in percent of carbonized resin | 7.7 | | 8.34 | |
| Gas permeability | $^1 8.2 \times 10^{-8}$ | | Leak | |
| Apparent specific gravity of 3d carbonization | | | 1.70 | |
| Fill-in percent of C resin | | | 9.21 | |
| 4th carbonization | | | (³) | |

$^1$ Cm.$^2$/sec.
$^2$ Following test is suspended owing to destruction.
$^3$ No leak.

In table 2, "fill-in percentage of resin" refers to an increase of weight of a carbon product impregnated with resin; e.g., when a carbon product of 100 grams weighs 110 g. after impregnation, its fill-in percentage is 10 percent.

In the following, the invention will be described in connection with the examples 1–5.

EXAMPLE 1

A mixture of 2 mol acetone and 1 mol furfural is prepared, and then as catalysts 1 percent by weight concentrated sulfuric acid and 1 percent by weight benzoyl peroxide are added thereto while agitated. The solution thus made turned from dark brown to black in color. In reference to the addition of sulfuric acid, it is found that the mixed solution tends to become gel if more than 5 percent by weight concentrated is added. Therefore, the concentrated sulfuric acid should be added in an amount of less than 5 percent, preferably, 1–2 percent by weight. In this example, 1 percent by weight sulfuric acid is added.

A graphite pipe (diameter 25 mm.) having an apparent specific gravity 1.56, porosity 22 percent, and gas permeability $0.2 \times 10^{-1}$ cm.$^2$/sec. is impregnated with the above solution under the reduced pressure, 20 mm. Hg for a period of 0.5–1 hour. This graphite pipe is manufactured by a known method and has the above physical properties. After impregnation, the graphite pipe is immersed in the 95 percent concentrated sul-hardened resin. It is found that the graphite pipe thus heat-treated at high temperature has 7.7 percent of the filled-in percentage of carbonized resin, 1.68 of apparent specific gravity, and $8.2 \times 10^{-8}$ cm.$^2$/sec. of gas permeability, showing a complete impermeability.

Table 3 shows the results of comparative tests on the physical properties of the graphite pipe obtained by successive steps of the above treatment process. As a result, it has been ascertained that the mechanical strength of an impervious graphite pipe heattreated at high temperature in the above process is far superior to that of the pipe untreated by the order of 60–80 percent.

TABLE 3

| | Apparent specific gravity | Filled-in percent of resin | Electric resistivity, ohm-cm. | Flexural strength, Kg./cm.$^2$ | Compressiv strength kg./cm. |
|---|---|---|---|---|---|
| Graphite pipe, untreated | 1.55 | | $92 \times 10^{-5}$ | 259–274, av. 265 | 222–254, av. 238 |
| Inpervious graphite pipe completely hardened at 200° C. | 1.74 | 12.3 | $94 \times 10^{-5}$ | 374–391, av. 380 | 319–336, av. 328 |
| Impervious graphite pipe heat treated at 1,000° C. | 1.68 | 9.5 | $88 \times 10^{-5}$ | 374–448, av. 415 | 392–451, av. 422 |

NOTE.—av.=average.

From the foregoing, it has been found that the resinous solution consisting of acetone, furfural, sulfuric acid, and benzoyl peroxide is the best, and an impervious carbon article which is resistant to the temperature of 1,000° C. is obtained by performing the above process. On the other hand, the resinous solution consisting of furfural, sulfuric acid and benzoyl peroxide with no addition of acetone has exhibited an inferior result, even though several cycles of the process have been carried out.

In addition, the resinous solution containing no addition of two catalysts, sulfuric acid and benzoyl peroxide does no good to the graphite pipe irrespective of the presence of acetone.

EXAMPLE 2

A resinous solution is prepared by adding 1 percent by weight concentrated sulfuric acid as a catalyst to the mixture of 3 mols acetone and 2 mols furfural, and adding 25 parts by weight the mixture of divinylbenzene and 1 percent by weight benzoyl peroxide as a catalyst to 75 parts by weight the solution of acetone, furfural, and sulfuric acid specified above.

A carbon product to be treated is provided by laminating a plurality of graphite cloth one another, bonding them with a resinous binder, molding an assembly thus made under pressure, and finally carbonizing and/or graphitizing the laminated assembly. The assembly is impregnated with the above resinous solution under reduced pressure. A hardening treatment of this resin is similarly effected as in example 1. Particularly, in this example, the graphite laminate was heated at the temperature of 200° C. to harden the impregnated resin, and then heattreated continuously in the hot air of 250° C. for a period of 50 hours, which is called, "air heat treatment." It has been found that this air heat treatment does beneficial effects in a carbonization yield of impregnated resin, in particular, divinylbenzene resin. Hence, it is easy to make it to be impervious.

By this air heat treatment, the graphite laminate treated by the above process had 8.54 percent of resin filled-in percentage, 1.55 of apparent specific gravity, and $6 \times 10^{-5}$ cm.$^2$/sec. of gas permeability while, prior to the treatment, it had 1.21 of apparent specific gravity and $8 \times 10^{-1}$ cm.$^2$/sec. of gas permeability.

Moreover, the graphite laminate carbonized at 800° C. increased its properties on the order of 1.34 of apparent specific gravity, 6.85 percent of filled-in percentage of carbonized resin, and $2.8 \times 10^{-4}$ cm.$^2$/sec. of gas permeability. This carbonized graphite laminate has proved to be useful as a practical impervious article.

EXAMPLE 3

About 300 cc. of chlorine gas as a catalyst is continuously blown into 500 cc. of the mixture of 2 mols acetone and 1 mol furfural for a period of about 30 minutes to produce a resinous solution. In this case, the liquid mixture turns black and evolves heat with the introduction of chlorine gas. Hence the introduction of chlorine gas was effected while the solution was cooled in the water bath with agitation. A carbon article to be treated in this example was manufactured by the steps of providing finely divided coking coal of less than 200 mesh, placing a quantity of finely divided coking coal in the absence of a binder in a mold, molding the coal in the mold under the molding pressure of 2 tons per cm.$^2$ at room temperature, and carbonizing the molded coal at the temperature of 1,000° C. in an inert atmosphere. The carbon article thus made has 1.54 of apparent specific gravity and $1 \times 10^{-2}$ cm.$^2$/sec. of gas permeability.

The carbon article was impregnated with the above resinous solution, hardened by the same process as described in example 1, and heattreated at the temperature of 800° C. In consequence, the carbon article treated and heattreated at 800° C. in the above process has 1.66 of apparent specific gravity, 5.8 percent of filled-in percentage of carbonized resin, and $5.2 \times 10^{-4}$ cm.$^2$/sec. of gas permeability, showing a considerable improvement over the untreated one. The carbon article treated only once in accordance with the process of example 3 proved to be useful for a practical impervious one.

EXAMPLE 4

Examples 4–5 relate to the manufacture of a low permeability crucible, the manufacture of an untreated crucible is summarized as follows: A 100 percent mixture of 30 percent by weight of finely divided coke of 320 mesh, 40 percent by weight of coke of 200 mesh, and 30 percent by weight of coke of 100 mesh is added with 35–40 percent by weight pitch binder based on the mixture of coke to mix them at 180° C. for a period of 40 minutes to 1 hour, this mixed paste is cooled to 110° C., then placed in a metallic mold, the raw paste is molded under a pressure of 100–150 kg./cm.$^2$, a molded object is heattreated at 800° C. in an inert atmosphere, and cooled to room temperature. This object is held at a temperature of 2,500°–3,000° C. for a period of 1 hour in a graphitization furnace, then, cooled to room temperature, and withdrawn to machine it for a crucible. Thus, for example, the crucible having an outer diameter 100 mm., an inner one 75 mm., and a height 75 mm. is made.

A resinous solution consisting of 3 mols acetone and 2 mols furfural, with the addition of two catalysts 1 percent by weight sulfuric acid and 1 percent benzoyl peroxide is provided to impregnate a crucible with it. This solution has about 0.4 centipoises of viscosity less than that of water, hence it is easy to impregnate a porous carbon article under the atmospheric pressure. It should be cautioned that the above impregnation be effected while the solution is liquid since it tends to continue its polymerization as time goes on.

Next, the above graphite crucible is impregnated with the above resinous solution under the reduced pressure, 100 mm. Hg for a period of 30 minutes to 1 hour, and then it is immersed in the bath under the normal pressure recovered from the reduced one at room temperature for a period of 1 hour. Subsequently, the crucible impregnated with the resinous solution is immersed in the 95 percent concentrated sulfuric acid bath for a period of 10–16 hours to harden the solution, and this hardening is further promoted by heat at a temperature of 200°–250° C. At this stage, it has been found that the crucible thus treated contains about 6–12 percent by weight hardened resin.

Then, this graphite crucible is gradually heated in an inert atmosphere up to the temperature of 1,200° C. where the vacuum deposition of vaporized aluminum is effected. At this stage, it has been also found that the percentage of carbonized resin of the impregnated one amounts to 3–8 percent by weight. In order to make a completely impervious graphite crucible, it is preferred that the above treatment process should be repeated two or three times over an object to be treated thereby.

EXAMPLE 5

A graphite crucible is impregnated with a resinous solution consisting of 2 mols furfural and no acetone with the addition of a catalyst 1 percent by weight sulfuric acid, and treated in accordance with the process as described in example 1 to polymerize the solution with the formation of a resinous substance and carbonize this resin by heat treatment. As a result, it is shown that the treated crucible contains 8–10 percent by weight hardened resin after hardening thereof, and the filled-in percentage of carbonized resin resulting from carbonization thereof is 3–6 percent by weight. Accordingly, in this example, the carbonization percentage of the resin is low. Hence it is required to repeat the above process four or five times for making a completely impermeable crucible by means of the above solution containing no acetone. It follows that the solution containing acetone is more advantageous in making an impermeable crucible than the one containing no acetone.

Table 4 shows the results of comparative tests conducted on an actual service in connection with the carbonaceous crucibles made by the processes of examples 4–5 and also by the known high-density method as well as the conventional one.

Table 4

|  | Apparent Specific Gravity | Number of Services Till Destruction |
|---|---|---|
| Crucible of Ex. 4 | 1.72 | 15–22 |
| Crucible of Ex. 5 | 1.71 | 14–20 |
| Crucible of High Density | 1.84 | 5–10 |
| Crucible of Prior Art | 1.69 | 2–3 |

From the above, it is seen that the carbonaceous crucible made in accordance with this invention of even less than 1.8 of its apparent specific gravity has a longer life twice or more than that of the conventional one while the conventional carbonaceous crucible has been required as having more than 1.8 of its apparent specific gravity.

Several embodiments of the present invention have been described, but it is understood that many changes can be made without departing from the spirit of the invention, and above embodiments should be interpreted as illustrative only, not as limited.

We claim:

1. A method for the manufacture of heat-resistant carbonaceous products having low permeability which comprises the steps: providing a liquid mixture consisting of 2-3 mols acetone and 1-2 mols furfural, adding to said liquid mixture 0.1-5 percent by weight an acid selected from the group consisting of sulfuric acid, hydrochloric acid, and toluene-sulfonic acid and 0.1-5 percent by weight benzoyl peroxide, said acid and said benzoyl peroxide being a catalyst, respectively, to form a resinous solution adapted for impregnating carbonaceous products, impregnating said carbonaceous products with said resinous solution at room temperature under reduced pressure for a period of 30 minutes to 1 hour, then immersing said carbonaceous products impregnated with said solution in the 95 percent concentrated sulfuric acid bath for a period of 10 to 16 hours to cure said solution contained within said carbonaceous products, withdrawing said carbonaceous products from said bath, rinsing said products in water, drying said products, heating said products in air heated to a temperature of 200° to 250° C. to further cure said resinous solution, heattreating said products at a temperature of up to 1,000° C. in an inert atmosphere for a period of 100-200 hours, at a temperature of 1,000°-2,000° C. in an inert atmosphere for a period of at least 15 minutes, at a temperature of 2,000°-'° C. in an inert atmosphere for a period of at least 15 minutes, and cooling said products to room temperature.

2. A method according to claim 1 in which divinyl benzene or trivinyl benzene is added to the liquid mixture.

3. A method as claimed in claim 1 in which a gaseous substance selected from the group consisting of oxygen, ozone, and chlorine in place of said acid is blown into said liquid mixture.

4. A method according to claim 3 in which divinyl benzene is added to the liquid mixture.

5. A method according to claim 3 in which trivinyl benzene is added to the liquid mixture.

* * * * *